United States Patent [19]

Ueno

[11] Patent Number: 5,079,574
[45] Date of Patent: Jan. 7, 1992

[54] MOTOR-DRIVEN CAMERA
[75] Inventor: Fuminori Ueno, Tokyo, Japan
[73] Assignee: Asahi Kogaku Kogyo Kabushiki Kaisha, Tokyo, Japan
[21] Appl. No.: 560,767
[22] Filed: Jul. 31, 1990
[30] Foreign Application Priority Data
Aug. 17, 1989 [JP] Japan ................... 1-96131[U]
Aug. 17, 1989 [JP] Japan ................... 1-212007
[51] Int. Cl.$^5$ .............................................. G03B 15/05
[52] U.S. Cl. ............................. 354/149.11; 354/173.1; 354/214
[58] Field of Search ............... 354/145.1, 149.11, 152, 354/173.1, 204, 212, 214

[56] References Cited
U.S. PATENT DOCUMENTS 4,162,837 7/1979 Haragushi ................. 354/173.1
4,472,042 9/1984 Iwata et al. ................. 354/149.11 X
4,545,667 10/1985 Niwa et al. ................. 354/149.11 X
4,847,647 7/1989 Ueda ................. 354/149.1
4,970,539 11/1990 Sasagaki et al. ........... 354/149.11 X

FOREIGN PATENT DOCUMENTS 0275089 7/1988 European Pat. Off. .
2171809 9/1986 United Kingdom .

Primary Examiner—A. A. Mathews
Attorney, Agent, or Firm—Sandler, Greenblum & Bernstein

[57] ABSTRACT

A motor-driven camera having a motor-driven strobe driving mechanism which moves a strobe housing up and down, a motor-driven film rewinding mechanism, and a common motor which rotates in one direction to drive the strobe driving mechanism and rotates in the reverse direction to drive the film rewinding mechanism.

15 Claims, 6 Drawing Sheets

MOTOR-DRIVEN CAMERA

BACKGROUND OF THE INVENTION

1. Field of the Invention

The present invention relates to a motor-driven camera in which all the actuations of up-down movements of a retractable strobe, a mirror or mirrors, a shutter, and film winding and film rewinding are performed by motors.

2. Description of the Related Art

A known motor-driven camera usually has two or more motors as drive sources. This is because it is very difficult to realize a simple mechanism in which all the operations as mentioned above are effectively driven by a single motor. In a known camera having two motors, the film winding and rewinding mechanism, the mirror moving mechanism and the shutter charge mechanism are driven by one of the motors and the retractable strobe is actuated by the other motor. However, in the known camera, one of the motors is used only to actuate the strobe, resulting in an ineffectual use of motor.

SUMMARY OF THE INVENTION

The primary object of the present invention is to provide a motor-driven camera in which the motor for operating the strobe is also used effectively to rewind the film.

To achieve the object mentioned above, according to the present invention, there is provided a motor-driven camera in which a retractable strobe driving mechanism, a mirror driving mechanism, a shutter charging mechanism, a film winding mechanism and a film rewinding mechanism are all driven by two motors, wherein the film winding mechanism, the mirror driving mechanism, and the shutter charging mechanism are driven by a first motor, and the retractable strobe driving mechanism and the film rewinding mechanism are driven by a second motor.

According to another aspect of the present invention, there is provided a motor-driven camera having a retractable strobe driving mechanism which electrically moves a strobe housing up and down and a motor-driven film rewinding mechanism, comprising a common motor which rotates in a direction to drive the strobe driving mechanism and rotates in the reverse direction to drive the film rewinding mechanism.

With this construction, the drive force of the common motor can be easily and effectively utilized to drive the strobe driving mechanism and the film rewinding mechanism.

Perferably, the strobe driving mechanism is located on the side of a pentagonal prism adjacent to a spool chamber, so that the common motor is located on the film patrone (cartridge) chamber, thus resulting in more effective space utilization and a decreased path length for power transmission.

BRIEF DESCRIPTION OF THE DRAWINGS

The invention will be described below in detail with reference to the accompanying drawings, in which.

DESCRIPTION OF THE PREFERRED EMBODIMENTS

Figure 1:
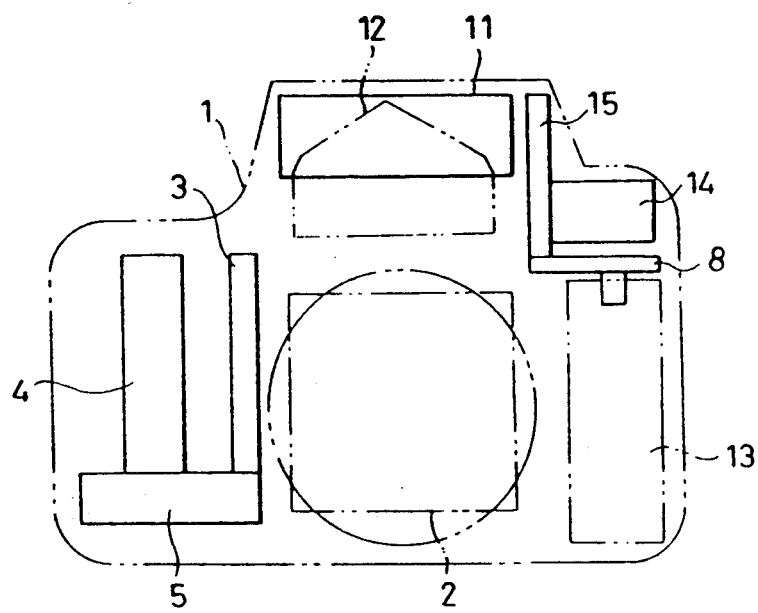
FIG. 1 is a front elevational view of the main components of a motor-driven camera according to the present invention.

FIG. 1 shows a front elevation of a single-lens reflex camera to which the present invention is applied. A mirror driving and shutter charging mechanism 3, known per se, is provided on the left side of a mirror box 2 which is located at the center of a camera body, as viewed from front. On the left side of the mirror driving and shutter charging mechanism 3 is provided a first motor 4, the axis of which extends in the vertical direction. A film winding mechanism 5 is provided below the first motor 4. The first motor 4 is usually provided in a film winding spool to drive the mirror driving and shutter charging mechanism 3 and the film winding mechanism 5, as is well known.

A strobe housing 11 which is movable between an upper position (projected position) and a lower position (retracted position) is provided on a pentagonal prism 12. A strobe housing driving mechanism 15 is provided on the right side of the pentagonal prism 12. A second motor (common motor) 14 is provided above a film cassette chamber 13 to selectively drive the strobe housing driving mechanism 15 and a film rewinding mechanism 8. The improvement of the present invention is mainly directed to the mechanisms driven by the second motor 14.

Figure 2:
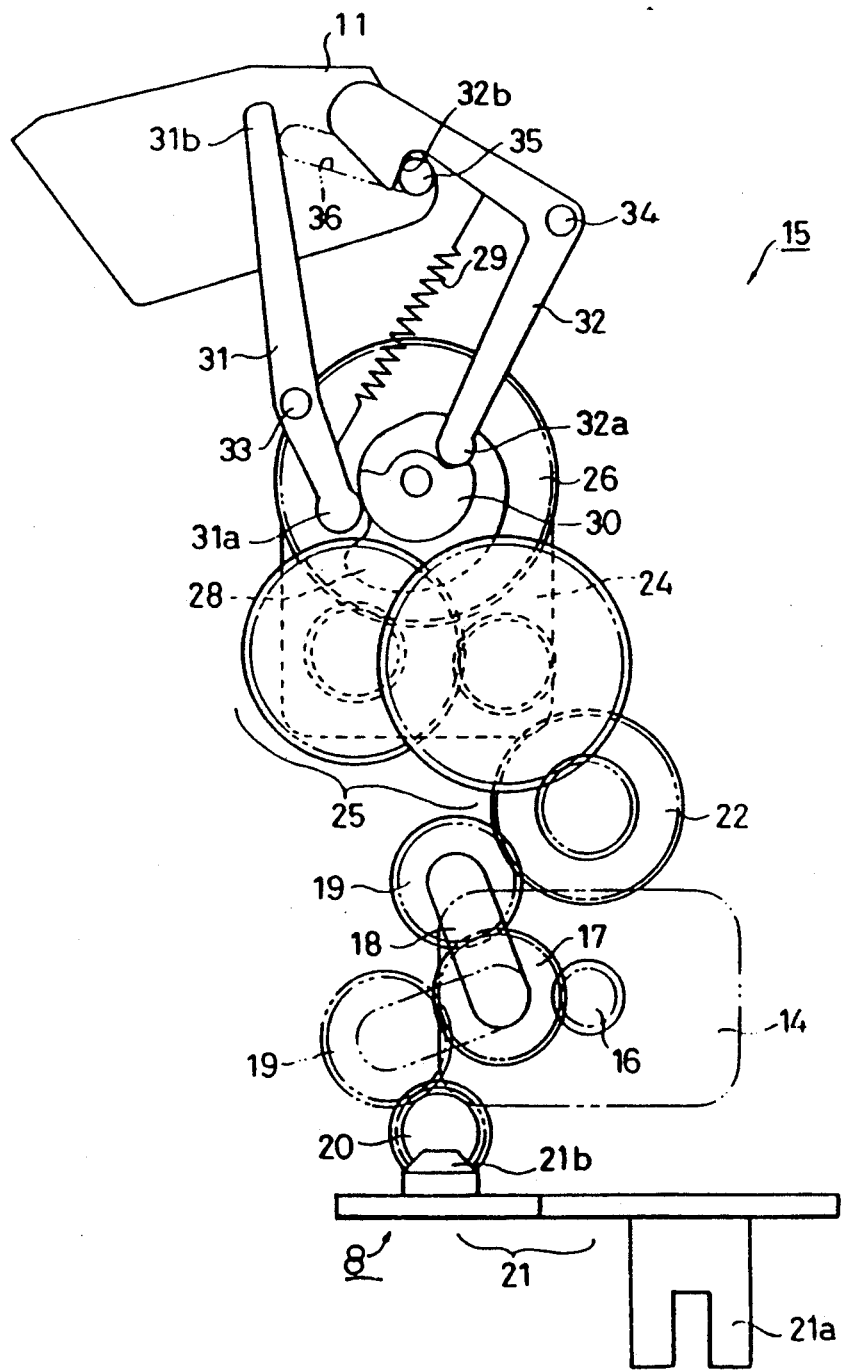
FIG. 2 is a side elevational view of an internal mechanism of a strobe incorporated in a camera according to the present invention.
Figure 3:
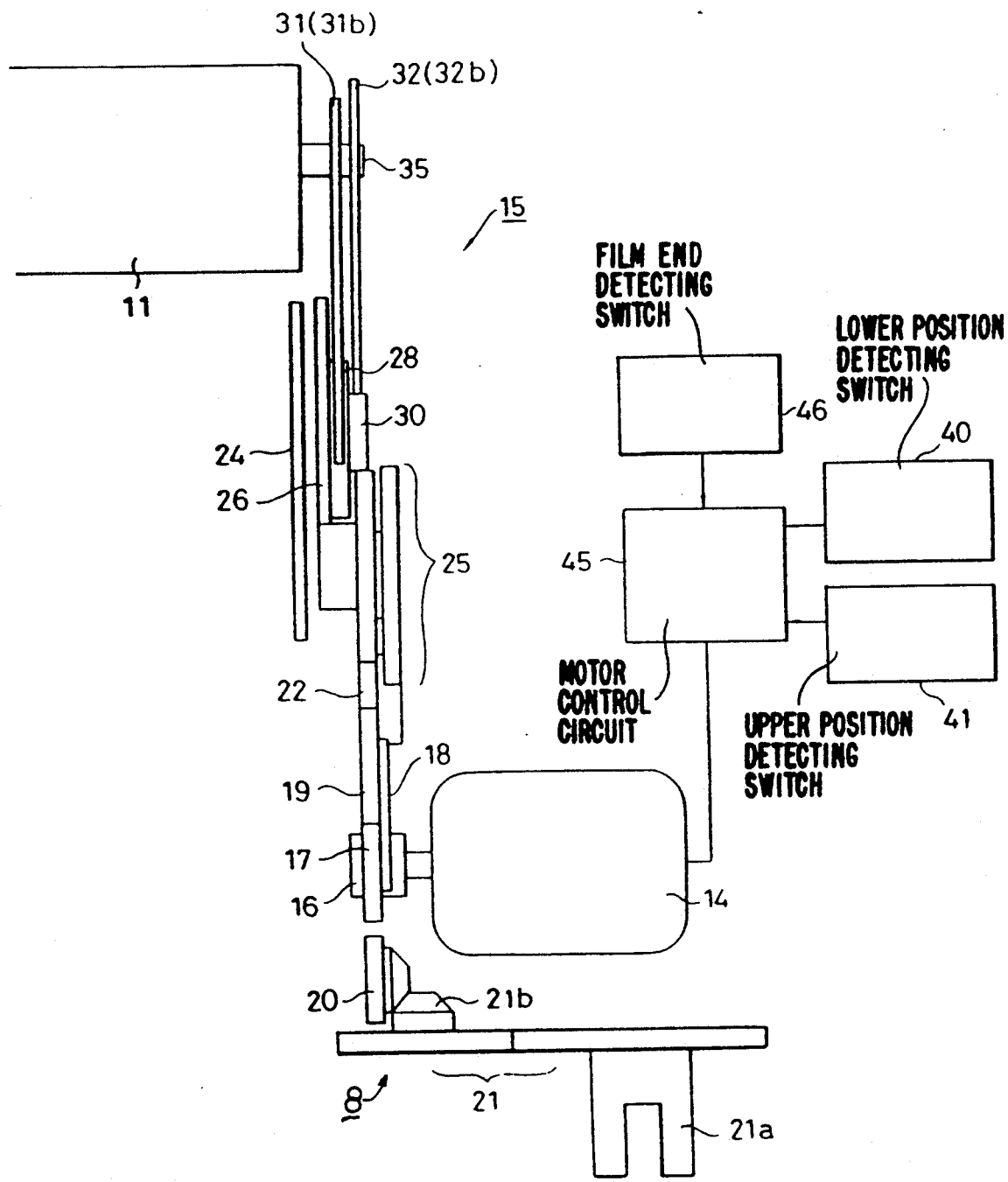
FIG. 3 is a front elevational view of FIG. 2.

FIGS. 2 and 3 show the second motor 14, the strobe driving mechanism 15, and the film rewinding mechanism 8. A pinion 16, which is secured to the output shaft of the second motor 14, is in mesh with a sun gear 17. The sun gear 17 is frictionally engaged by a swing lever 18 which is pivoted coaxially to the sun gear. The swing lever supports a planet gear 19 at its free end, which is in mesh with the sun gear 17. As a result, the swing lever 18 swings in accordance with the rotational directions of the sun gear 17, so that the planet gear 19 selectively engages with a rewinding gear 20 of the film rewinding mechanism 8 and a strobe gear 22 of the strobe driving mechanism 15.

The rewinding gear 20 is in mesh with a gear 21b of the rewinding gear block 21, so that when the gear 21b rotates, a rewinding fork 21a which is engaged by the film winding shaft in the patrone cassette chamber 13 rotates.

The strobe gear 22 is in mesh with a reduction gear train 25 which is rotatably supported on a strobe switch substrate 24 and which is in mesh with a one rotation cam gear 26 rotatably supported on the strobe switch substrate 24. One turn of the one rotation cam gear 26 in the same direction causes the strobe housing 11 to move up from the lower position thereof and move down to the initial position thereafter.

The one rotation cam gear 26 has a downward movement cam 28 having a predetermined cam profile on the outer periphery thereof and a lower position keeping cam 30 having a predetermined cam profile on the outer periphery thereof. The cams 28 and 30 are integral with the one rotation cam gear 26. The cams 28 and 30 come into contact with cam followers 31a and 32a of the lower ends of a downward movement lever 31 and a lower position keeping lever 32, respectively. The downward movement cam 28 has an up-section 28a and a down-section 28b. The lower position keeping cam 30 has a lower position keeping section 30a and an open section 30b (FIG. 4A).

The downward movement lever 31 and the lower position keeping lever 32 are pivoted to an immovable portion of the camera body through shafts 33 and 34, respectively. The downward movement lever 31 and the lower position keeping lever 32 are engaged by a posture control pin 35 which is provided on the side face of the strobe housing 11 to move the strobe housing 11 up and down and to maintain the strobe housing 11 in the lower position.

Figures 4A, 4B:
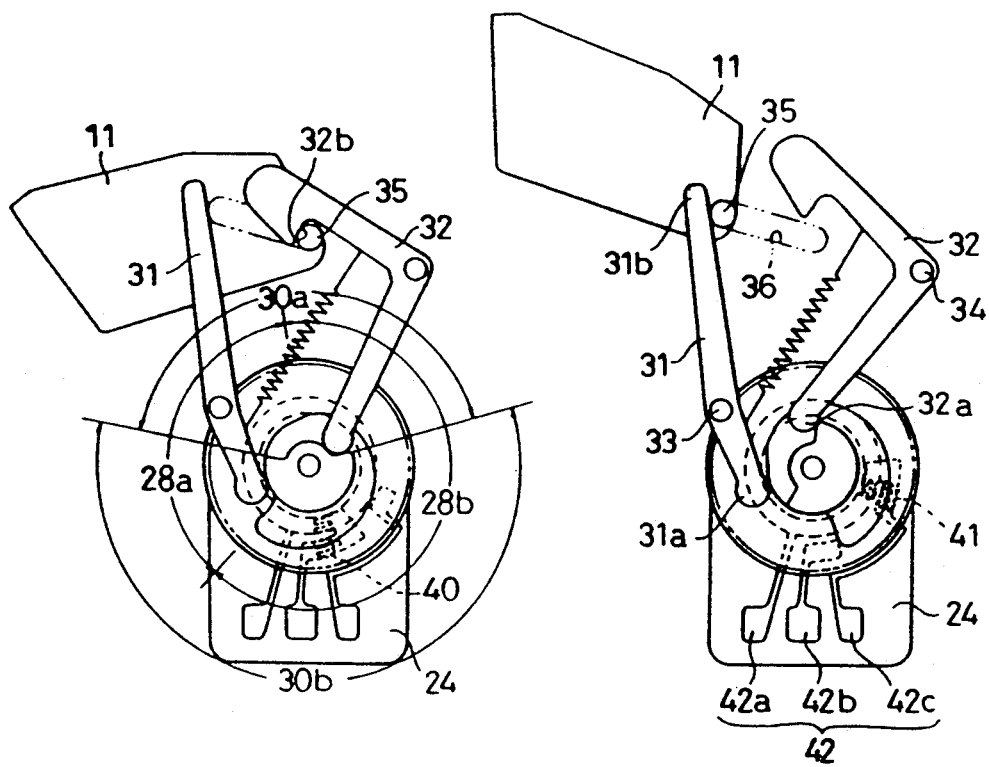
FIGS. 4A, 4B, 4C and 4D are side elevational views of the main components of a motor-driven camera shown in different operational positions, according to the present invention.
Figures 4C, 4D:
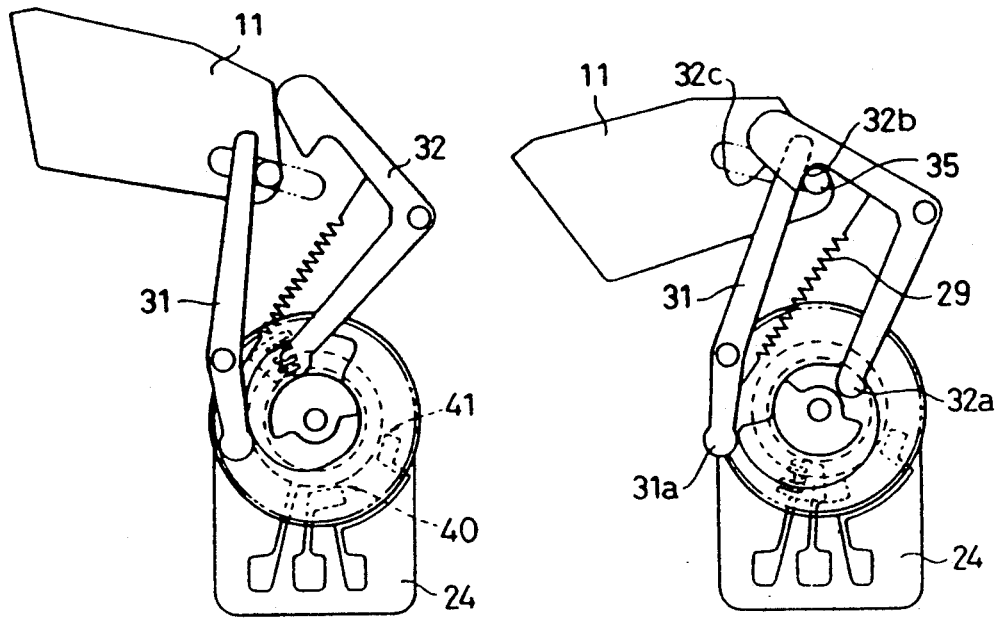
Figure 5:
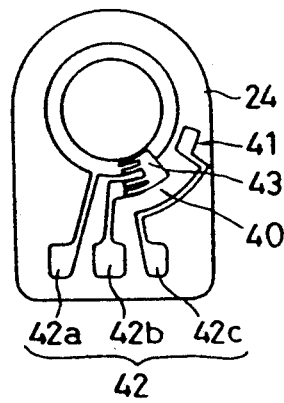
FIG. 5 is a front elevational view of a printed circuit board and a brush, forming an upward movement detecting switch and a downward movement detecting switch; and, FIG. 6 is a timing chart of the operations of a motor-driven camera according to the present invention.

The strobe housing 11 is movable between a retracted position (lower position) shown in FIGS. 4A and 4D and a projected position (upper position) shown in FIG. 4B, by means of a link mechanism (not shown) including a cam groove 36 in which the posture control pin 35 is fitted. The strobe housing 11 is biased by a biasing means (not shown), such as a spring, toward the projected position. The position and the direction of the strobe housing 11 is determined by the position of the posture control pin 35 in the cam groove 36. As is well known, the strobe housing 11 emits strobe light.

The opposite end 31b of the downward movement lever 31 far from the cam follower 31a is engaged by the posture control pin 35 to move the strobe housing 11 downwardly toward the lower position against the biasing means with the help of the downward movement cam 28. On the other hand, the opposite end (hook) 32b of the lower position keeping lever 32 far from the cam follower 32a is engaged by the posture control pin 35 to maintain the strobe housing 11 in the lower position due to the lower position keeping cam 30. Between the downward movement lever 31 and the lower position keeping lever 32 is provided a tensile spring 29 which causes the cam followers 31a and 32a to continuously come into contact with the downward movement cam 28 and the lower position keeping cam 30, respectively.

Between the strobe switch substrate 24 and the one rotation cam gear 26, a lower position detecting switch 40 and a upper position detecting switch 41 are provided which are constituted by a printed circuit board 42 secured to the strobe switch substrate 24 and a brush 43 secured to the one rotation cam gear 26. When a common land 42a formed on the printed circuit board 42 is connected to a lower position detecting land 42b through the brush 43, completion of the downward movement of the strobe housing 11 is detected, and when the common land 42a is connected to an upper position detecting land 42c through the brush 43, completion of the upward movement of the strobe housing 11 is detected.

The second motor 14 is controlled by a motor control circuit 45 to which the ON/OFF signals of the lower position detecting switch 40 and the upper position detecting switch 41 are input. Also, a film end signal for indicating that the end of the film has been reached is input to the motor control circuit 45.

Figure 6:
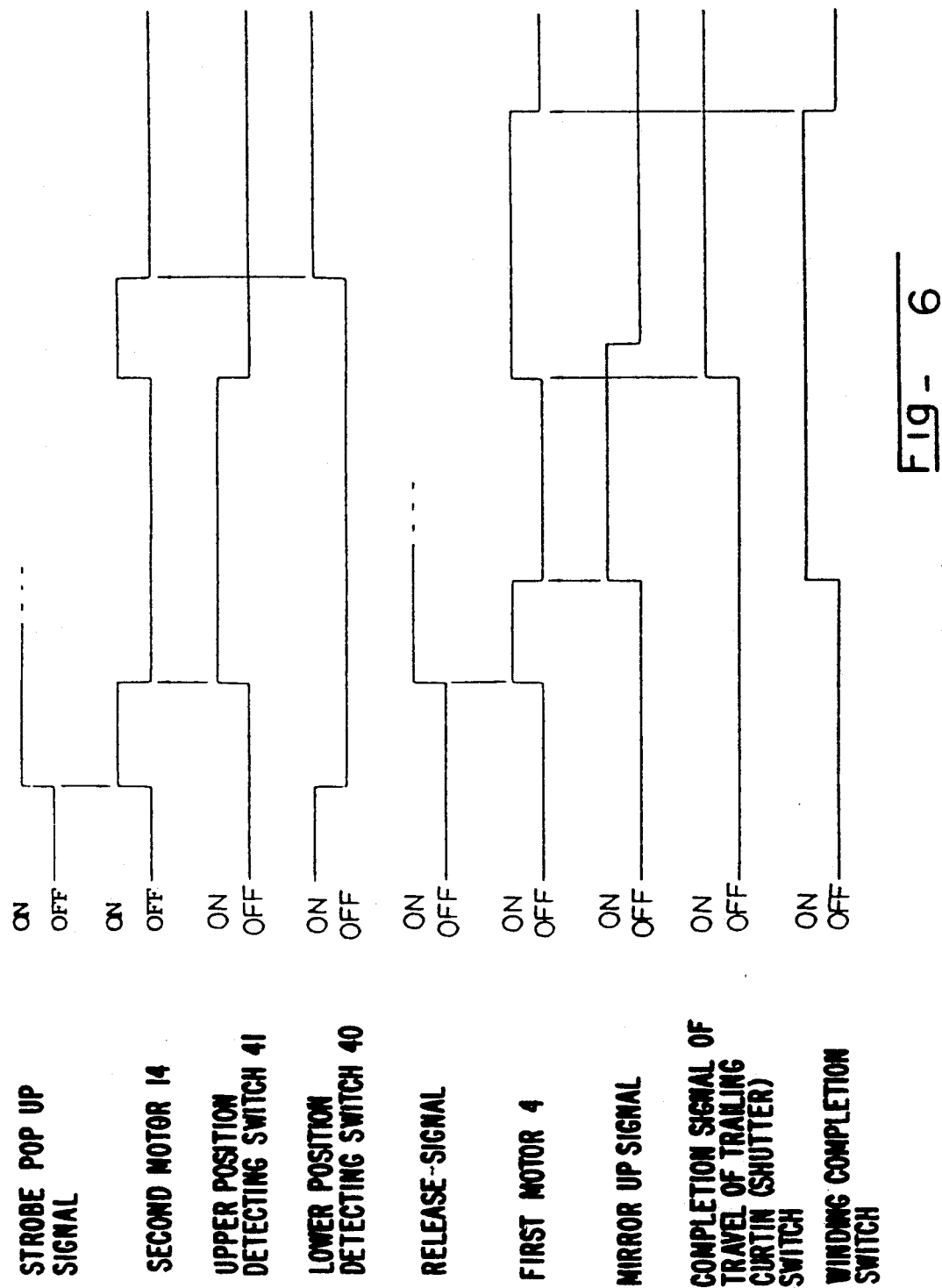

The motor-driven camera of the present invention, as constructed above operates as follows (FIG. 6).

When the strobe is used, a strobe pop-up signal is automatically or manually issued, provided that the luminance of an object to be taken is below a predetermined value. As a result, the second motor 14 is driven to rotate in the forward direction by the motor control circuit 45. The rotation of the second motor 14 in the forward direction causes the one rotation cam gear 26 to rotate in the counterclockwise direction, as shown in FIGS. 2 and 4A, so that the cam follower 32a of the lower position keeping lever 32 is moved from the lower position keeping section 30a of the lower position keeping cam 30 to the open section 30b. As a result, the lower position keeping lever 32 rotates in the clockwise direction about the shaft 34, as shown in FIG. 4B, so that the hook 32b of the lower position keeping lever 32 is disengaged from the posture control pin 35. In this state, the cam follower 31a of the downward movement lever 31 is in contact with the up-section 28a of the downward movement cam 28 and the leg 31b is in the forwardmost position. Accordingly, the strobe housing 11 which is biased toward the upper position is moved to the upper position in accordance with the cam profile of the cam groove 36 in which the posture control pin 35 is fitted.

When the strobe housing 11 is moved to the upper position, the brush 43 secured to the one rotation cam gear 26 connects the common land 42a and the upper position detecting land 42c. Namely, the upper position detecting switch 41 is made ON. As a result, the rotation of the second motor 14 is stopped. Consequently, the strobe housing 11 is maintained in the upper position. The strobe charging circuit of the strobe housing 11 is charged prior to the upward movement of the strobe housing 11.

Thereafter, when the release signal is issued, the mirror is moved up by the first motor 4, so that the upward movement signal of the mirror is issued to stop the first motor 4. After that, the focal plane shutter operates. When the completion of the movement of the trailing curtain of the shutter is detected, the first motor 4 rotates again to charge the shutter and the mirror and to commence the winding operation of the film. When the winding operation of the film is completed, the first motor 4 stops rotating. The winding completion switch is turned ON in response to the upward movement signal of the mirror. Thereafter, the motor 4 rotates in accordance with the completion of the movement of the trailing curtain of the shutter to wind the film. When the film winding is finished, the winding completion switch is turned OFF.

As soon as the completion signal of the travel of the trailing curtain is issued, the second motor 14 begins rotating again in the forward direction. As a result, the one rotation cam gear 26 further rotates in the counterclockwise direction, so that the cam follower 31a of the downward movement lever 31 begins coming into contact with the down-section 28b of the downward movement cam 28 to rotate the downward movement lever 31 in the clockwise direction about the shaft 33, whereby the leg 31b pushes the posture control pin 35. As a result, the strobe housing 11 is moved downwardly in accordance with the cam groove 36 (FIG. 4C). Before the downward movement of the strobe housing 11 is finished, the cam follower 32a of the lower position keeping lever 32 comes into contact with the lower position keeping section 30a of the lower position keeping cam 30, so that the lower position keeping lever 32 is rotated to a position in which it can be engaged by the posture control pin 35 by the tensile spring 29. During the downward movement, the posture control pin 35 comes into contact with a rear tapered portion 32c of the hook 32b to move the same up. When the downward movement is completed, the hook 32b is engaged by the posture control pin 35. Namely, the strobe housing 11 is kept in the lower position.

A further rotation of the one rotation cam gear 26 causes the cam follower 31a of the downward movement lever 31 to come into contact with the up-section 28a of the downward movement cam 28. As a result, the downward movement lever 31 is rotated in the counterclockwise direction to move the cam follower 31a to the forwardmost position. In this state, the brush 43 connects the common land 42a and the lower position detecting land 42b. Namely, the lower position detecting switch 40 is turned ON to stop the second motor 14.

The operations mentioned above are repeated every time a picture is taken when the strobe pop-up signal is ON.

On the other hand, when the end of the film is detected by the film end detecting switch 46, the motor control circuit 45 reverses the second motor 14. As a result, the swing lever 18 swings to engage the planet gear 19 with the rewinding gear 20. Consequently, the rewinding fork 21a is rotated through the rewinding gear block 21 to rewind the film onto the film winding shaft in the film spool.

The above discussion has been mainly directed to the components which are driven by the second motor 14. In the present invention, the operations of the mirror charging, the shutter charging and the film winding are effected by the first motor 4. However, since the components which are driven by the first motor 4 are well known and since the present invention is not directly directed to those components, no detailed explanation thereof is given here.

Further description of the first motor and the components and operations driven and controlled thereby is found in U.S. Pat. No. 4,544,251 and copending application Ser. No. 07/403,383, the entire disclosures of each of which is expressly incorporated herein by reference thereto.

In the illustrated embodiment, in which the control of the second motor 14 is partly carried out in accordance with the strobe pop-up signal, the strobe pop-up signal can be given by a main switch of the camera.

I claim:

1. A motor-driven camera comprising:
   a motor-driven strobe driving mechanism which moves a strobe housing in up and down directions,
   a motor-driven film rewinding mechanism which rewinds the film into a film cassette, and,
   a common motor which rotates in a first direction to drive only said strobe driving mechanism and rotates in the reverse direction to drive only said film rewinding mechanism, wherein torque of said common motor is substantially directly transmitted to said strobe driving mechanism to move said strobe housing in at least one of said up and down directions.

2. A motor-driven camera according to claim 1, wherein said strobe driving mechanism is located on the side of a pentagonal prism adjacent to a cassette chamber which receives said film cassette.

3. A motor-driven camera according to claim 2, wherein said common motor is located above said cassette chamber.

4. A motor-driven camera according to claim 1, wherein said strobe housing is movable between an upper projected position and a lower retracted position.

5. A motor-driven camera according to claim 4, wherein said strobe driving mechanism comprises a one rotation gear which is driven by said common motor in said first direction and which rotates by one turn to move said strobe housing between said lower and upper positions.

6. A motor-driven camera according to claim 5, wherein said one rotation gear comprises a lower position detecting switch of the strobe housing and an upper position detecting switch, such that when either of said detecting switches are turned ON, said common motor is stopped from rotating.

7. A motor-driven camera according to claim 5, further comprising a posture control pin which controls the posture of said strobe housing during said movement between the upper position and said lower position.

8. A motor-driven camera according to claim 7, wherein said one rotation gear comprises a cam mechanism which moves said strobe housing between said upper position and said lower position through said posture control pin during one turn of said one rotation gear.

9. A motor-driven camera according to claim 8, wherein said cam mechanism comprises an upward movement cam and a lower position keeping cam, both being integral with said one rotation gear, a downward movement lever and a lower position keeping lever, both being rotatably supported at their intermediate portions, said downward movement lever and said lower position keeping lever being engaged at their one end by the respective upward movement cam and the lower position keeping cam and at their opposite ends by said posture control pin.

10. A motor-driven camera according to claim 1, wherein said film rewinding mechanism comprises a rewinding fork which is engaged by a film winding shaft and a rewinding gear train which rotates said rewinding fork, so that when said common motor is reversed, a first gear of said rewinding gear train is rotated.

11. A motor-driven camera according to claim 10, wherein said strobe driving mechanism comprises a sun gear which is driven by said common motor, a swing lever which is coaxially connected to said sun gear, and a planet gear which is in mesh with said sun gear.

12. A motor-driven camera according to claim 11, wherein said strobe driving mechanism comprises a reduction gear train which is driven by the rotation of said common motor in said first direction and which has a strobe gear at the beginning of said reduction gear train, so that said plant gear is selectively engaged by the rewinding gear train and said strobe gear in accordance with the direction of the rotation of the common motor.

13. A motor-driven camera comprising:
   a motor-driven strobe driving mechanism for moving a strobe housing between an upper position and a lower position,
   a motor-driven mirror driving mechanism,
   a motor-driven shutter charging mechanism,
   a motor-driven film winding mechanism,
   a motor-driven film rewinding mechanism, a first motor for driving said film winding mechanism, said mirror driving mechanism and said shutter charging mechanism, and, a second motor for driving said strobe driving mechanism and said film rewinding mechanism.

14. A motor-driven camera comprising:

a sun gear which is rotated by a reversible common motor;

a swing lever which is coaxially pivoted to said sun gear;

a planet gear which is rotatably supported on said swing lever to be in mesh with said sun gear;

a strobe gear which is in mesh with said planet gear when said common motor rotates in one direction;

a rewinding gear which is in mesh with said planet gear when said common motor rotates in the opposite direction;

a strobe driving mechanism which adapted to drive a strobe housing between an upper position and a lower position; and, a rewinding fork which is driven by said rewinding gear to engage with a film rewinding shaft.

15. A motor-driven camera according to claim 11, wherein said strobe driving mechanism comprises a one rotation gear which rotates by one turn to move the strobe housing between the upper position and the lower position.

* * * * *